United States Patent
Takatori et al.

[11] Patent Number: 5,958,362
[45] Date of Patent: Sep. 28, 1999

[54] METHOD OF PRODUCING ACTIVE MATERIAL POWDER FOR LITHIUM SECONDARY BATTERY

[75] Inventors: Kazumasa Takatori, Nagoya; Naoyoshi Watanabe, Aichi-ken; Toshihiko Tani, Nagoya; Tsuyoshi Sasaki, Aichi-ken; Akio Takahashi, Tokai; Masahiko Kato, Tokai; Akihiko Murakami, Tokai, all of Japan

[73] Assignee: Kabushiki Kaisha Toyota Chuo Kenkyusho, Aichi-ken, Japan

[21] Appl. No.: 08/824,967

[22] Filed: Mar. 27, 1997

[30] Foreign Application Priority Data

Mar. 28, 1996 [JP] Japan ................................ 8-103603
Mar. 21, 1997 [JP] Japan ................................ 9-087689

[51] Int. Cl.$^6$ ........................... C01B 13/14; C01G 49/00; C01G 3/02; H01M 4/32
[52] U.S. Cl. .......................... 423/592; 423/594; 423/596; 423/598; 423/599; 423/600; 423/604; 423/605; 423/606; 423/608; 429/223; 429/224
[58] Field of Search ................................. 423/592, 594; 429/223

[56] References Cited

U.S. PATENT DOCUMENTS

| | | | |
|---|---|---|---|
| 4,023,961 | 5/1977 | Douglas et al. | 75/0.5 |
| 4,649,037 | 3/1987 | Marsh et al. | 423/338 |
| 4,713,233 | 12/1987 | Marsh et al. | 423/608 |
| 5,358,695 | 10/1994 | Helble et al. | 423/592 |
| 5,447,708 | 9/1995 | Helble et al. | 423/593 |
| 5,648,057 | 7/1997 | Ueda et al. | 423/594 |

FOREIGN PATENT DOCUMENTS

| | | |
|---|---|---|
| 63-114065 | 5/1988 | Japan . |
| 2-9722 | 1/1990 | Japan . |
| 7-81905 | 3/1995 | Japan . |

*Primary Examiner*—Gary P. Straub
*Assistant Examiner*—Cam N. Nguyen
*Attorney, Agent, or Firm*—Oblon, Spivak, McClelland, Maier & Neustadt, P.C.

[57] ABSTRACT

The present method is to produce an active material powder formed of a spinel oxide containing lithium or a layer-structured oxide containing lithium for a lithium secondary battery which is uniform in composition, fine in particle size and free of oxygen defects, and which is unlikely to cause capacity deterioration resulted from repetitive charge/discharge cycles at a high current density.

A suspension 1 prepared by suspending an ingredient of the active material powder in a combustible liquid or an emulsion prepared by emulsifying a solution of the ingredient in the combustible liquid is sprayed in a droplet state 15 together with an oxygenic gas 2. The combustible liquid contained in the droplet 15 is burned to have the ingredient therein reacted and to evaporate the solvent. As a result, active material powder 4 formed of the spinel oxide containing lithium is obtained. An active material powder formed of the layer-structured oxide containing lithium is obtained by re-heating the oxide powder that has been generated by spraying and burning the droplet.

13 Claims, 3 Drawing Sheets

METHOD OF PRODUCING ACTIVE MATERIAL POWDER FOR LITHIUM SECONDARY BATTERY

BACKGROUND OF THE INVENTION

1. Field of the Invention

The present invention relates to a method of producing an active material powder for a positive electrode or a negative electrode of a lithium secondary battery using non-aqueous electrolyte.

2. Description of the Related Arts

Among various kinds of secondary batteries, the lithium secondary battery is known as supplying high voltage as well as less electrical discharge, resulting in excellent storage capability. Therefore, the lithium secondary battery is highly expected as being applicable to a wide variety of fields.

One of prior arts has disclosed that the lithium secondary battery is obtained by using metallic oxide such as $LiCoO_2$, $LiNiO_2$, $LiMn_2O_4$ or the like as an active material for the positive electrode and using lithium metal, lithium alloy or carbon that can occlude and release lithium ions or the like as an active material for the negative electrode (JPA Publication No. 114065/1988).

The above-described active materials are conventionally prepared by mixing lithium related material powder such as Li metal, Li oxide, Li hydroxide, Li carbonate or the like with a metal powder such as Mn, Ni and Co or oxide, hydroxide, carbonate thereof. The resultant mixture is heated at a high temperature for an extended period, which is called as a solid state reaction method.

The conventional method of producing the active material through the solid phase reaction method requires the process for heating the substance at a high temperature for an extended period. Conventionally as the active material reacts at a solid phase, the ingredient of the active material does not react sufficiently, thus failing to form the active material exhibiting uniform composition. The resultant active material tends to have a relatively large particle size ranging from 10 µm to 20 µm.

When the lithium secondary battery formed from the above-described active material is subjected to charge/discharge cycle under high current density, its capacity may be deteriorated to a greater extent.

Another prior art has disclosed the method of producing active material powder having uniform composition and small particle size for the lithium secondary battery that hardly deteriorates its capacity resulted from the charge/discharge cycle under high current density. More specifically, the active material powder is prepared by spraying the ingredient of the active material that has been dissolved in a solvent in the form of droplet. Then the droplet is heated to evaporate the solvent, thus providing the active material powder. This process is called as a spray pyrolysis method (Publication of JPA No. 9722/1990).

In the conventional spray pyrolysis method, temperature distribution occurs around a spot heated either from inside or outside. The resultant product, thus, is likely to fail to form uniform composition.

Especially when producing composite oxide using substances each having different vapor pressure, the resultant product is likely to have an irregular composition. The temperature distribution may cause increase or decrease in the temperature dependent on a certain spot even though the temperature condition has been set to be optimum for producing the oxide. As a result, it is difficult to control production of the composite oxide using the substance containing volatile component.

The third prior art does not relate to a method of producing the active material powder for the lithium secondary battery. It discloses the method of producing the above-described composite oxide powder exhibiting uniform composition with narrow temperature distribution at a heated spot.

In the aforementioned producing process called as a spray combustion method, a suspension prepared by suspending a material convertible into oxide by oxidation or an emulsion prepared by emulsifying a solution of the material in the combustible liquid is sprayed and the resultant mist is fired in an oxidizing atmosphere (Publication of JPA No. 81905/1995).

As the above spray combustion method consumes a large amount of oxygen for burning the combustible liquid, synthesizing the composite oxide exhibiting a spinel structure through this method may provide the material that has a large amount of oxygen defects.

Especially a spinel oxide containing lithium such as $LiMn_2O_4$ tends to deform its crystalline structure owing to lack of oxygen. Being used as the active material for the lithium secondary battery, this type of oxide may cause capacity deterioration resulted from repetitive charge/discharge cycles.

SUMMARY OF THE INVENTION

An objective of the present invention is to provide a method of producing an active material powder for a lithium secondary battery, which is formed of a spinel oxide containing lithium or layer-structured compound containing lithium exhibiting uniform composition, fine particle size, no lack of oxygen and preventing capacity deterioration resulted from the repetitive charge/discharge cycles under a high current density.

The present invention is realized by a method of producing an active material powder for a lithium secondary battery comprising the steps of preparing a suspension by suspending an ingredient of the active material powder in a combustible liquid or an emulsion by emulsifying solution containing the ingredient dissolved in a solvent in the combustible liquid; spraying the suspension or the emulsion into an atmosphere containing oxygen in a form of droplets; burning the combustible liquid contained in the droplets to have the ingredient contained therein reacted and to produce an active material powder formed of a spinel oxide containing lithium.

The present invention is further realized by a method of producing an active material powder for a lithium secondary battery comprising the steps of preparing a suspension by suspending an ingredient of the active material powder in a combustible liquid or an emulsion by emulsifying solution containing the ingredient dissolved in a solvent in the combustible liquid; spraying the suspension or the emulsion into an atmosphere containing oxygen in a form of droplets; burning the combustible liquid contained in the droplets to have the ingredient contained therein reacted and to produce an oxide powder; and re-heating the oxide powder at 400 to 1000° C. to produce an active material powder formed of a layer-structured oxide containing lithium.

This and other objects, features and advantages of the present invention will become more apparent upon a reading of the following detailed description and drawings.

DETAILED DESCRIPTION OF THE INVENTION

The most important feature of the first aspect of the present invention is that a suspension or an emulsion as an ingredient of the active material is atomized in the form of droplet in an oxygenic atmosphere. The droplets are heated by burning the combustible liquid for causing the ingredient to react, so that the active material powder formed of the spinel oxide containing lithium is obtained.

In the present invention, the droplets are sprayed in the oxygenic atmosphere where the reaction is promoted with sufficient oxygen supplied even under the burning condition.

The combustible liquid as a medium for the suspension or the emulsion is prepared by using at least one kind selected from the group consisting of light oil, heavy oil, kerosene, gasoline and the like.

It is preferable to emulsify the ingredient of the active material powder in the combustible liquid by adding the emulsifying agent or stirring with a homomixer or the like. It is preferable to use the emulsifying agent containing no metallic ion. Using the nonionic surfactant is especially desirable.

Using appropriate emulsifier such as sorbitan monolaurate or the like may provide the emulsion in which spherical particles each having uniform size are dispersed. Uniform size of the dispersed spherical particles may define the particle size of the resultant active material powder. The emulsion having uniform size of the dispersed particles can be easily produced. Accordingly this invention allows for easy production of the active material powder having uniform particle size.

The emulsion prepared by emulsifying a solution of the ingredient in the combustible liquid and further suspending the ingredient therein into the state where suspension co-exists with the emulsion can be used.

The suspension or emulsion can be sprayed together with oxygenic gas or sprayed in the oxygenic atmosphere (gas).

The method of spraying the suspension or emulsion together with the oxygenic gas is preferable because of providing high reaction efficiency. In the above method, the suspension or emulsion is supplied with a quantitative pump to an atomizer using compressed air for spraying into a reaction chamber. The more the spray amount is increased, the better the production efficiency becomes. However care should be taken to set the spray amount, so as not to lower the partial pressure of oxygen within the reaction chamber or increase the combustion temperature too high.

In the present invention, the suspension or emulsion is sprayed into a reaction chamber in the oxygenic atmosphere. Accompanied with the spray, the combustible liquid contained in the suspension or emulsion is burned. The combustible liquid is burned to form a burner flame. Alternatively the droplets may be passed through the flame or the part that has been heated to a high temperature.

It is preferable to use a pilot burner that supports stable combustion as well as facilitating ignition.

The atmosphere should contain enough oxygen to keep the active material powder from lack of oxygen during heating.

Therefore, the droplet has to be sprayed in the oxygenic atmosphere. It is preferable to control the partial pressure of oxygen within the reaction chamber in heating to 20% or more assuming that the combustible liquid is completely burned.

When spraying the suspension or emulsion together with the oxygenic gas, the amount of the oxygenic gas is controlled so that the partial pressure of oxygen is set to 20% or more. As a result, a spinel oxide containing lithium without oxygen defects can be synthesized, which is usable as the active material for the lithium secondary battery. Considering the amount of oxygen consumed by combustion of the combustible liquid such as kerosene, it is preferable to set the upper limit of the partial pressure of the oxygen to 95% or less.

The air, nitrogen gas or the gas containing mixture of the air and oxygen can be used as the oxygenic gas for generating the oxygenic atmosphere.

The prepared active material powder is collected and kept, so as not to be dispersed. Simultaneous with generation of the active material, exhaust gas containing steam is also generated. Therefore, the obtained active material may become wet owing to such steam.

It is preferable to collect the active material powder while it is hot and separate the exhaust gas from the resultant product. For example, a filter formed of a punching metal can be used to filtrate the product to obtain only active material powder, which will be accumulated and collected (Please see Examples.).

In the present invention, the ingredient of the active material is mixed in the suspension or in the liquid state as an emulsion for complete homogenization.

Since the thus homogenized droplets are sprayed and burned, the resultant active material powder keeps its composition uniform.

The ingredient momentarily reacts with heat generated in the combustion process within the droplets into the active material. In case of using the emulsion, solvent of the droplet is evaporated in the heat generated in the combustion process and discharged to the outside of the reaction system as wastes.

The resultant active material has a uniform composition.

Particles of the above active material are generated from the above-sprayed droplets. The active material is formed of a primary particle having a fine size or a secondary particle formed as a combination of those primary particles. (See FIG. 4) The particles derived from the sprayed droplets have an average particle size ranging from 0.01 to 10 μm.

In the present invention, the droplet is heated by burning the combustible liquid. The droplet is sprayed in the oxygenic atmosphere. The resultant spinel oxide containing lithium provides a high quality active material powder without oxygen defects.

Oxygen defects caused in the spinel oxide containing lithium can be expressed by a function of temperature and partial pressure of oxygen. As the temperature increases or the partial pressure of oxygen decreases, the oxygen defects are likely to occur. Therefore, oxygen defects can be prevented by keeping the partial pressure of oxygen to a specific level.

The active material powder used as the positive electrode or a negative electrode of the lithium secondary battery has a uniform composition and small particle size and hardly causes capacity deterioration resulted from the charge/discharge cycles under a high current density. As no oxygen defects occur, capacity deterioration rarely occurs resulted from repetitive charge/discharge cycles, thus providing an excellent lithium secondary battery.

Accordingly the present invention provides the active material powder for the lithium secondary battery which is formed of a spinel oxide containing lithium having uniform composition, small particle size and preventing capacity deterioration irrespective of the repetitive charge/discharge cycles under a high current density.

The present invention provides a method of producing an active material powder for a lithium secondary battery comprising the steps of: preparing a suspension by suspending an ingredient of the active material powder in an combustible liquid or an emulsion by emulsifying solution containing the ingredient dissolved in a solvent in the combustible liquid; spraying the suspension or the emulsion into an atmosphere containing oxygen in a form of droplets; burning the combustible liquid contained in the droplets to have the ingredient contained therein reacted and to produce an oxide powder; and re-heating the oxide powder at 400 to 1000° C. to produce an active material powder formed of a layer-structured oxide containing lithium.

The most important feature of the second aspect of the invention is to provide an active material powder formed of a layer-structured oxide containing lithium by spraying the droplets and heating in the similar way to the first invention and then the resultant oxide powder is re-heated at a temperature ranging from 400 to 1000° C.

The second invention is the same as the first invention with respect to production of the suspension or emulsion, droplet atomization, combustion of combustible liquid contained in the droplet and reaction of the ingredient contained in the droplet that have been already described.

In this method, the oxide powder is obtained from reaction of the ingredient contained in the droplet. Then this oxide powder is re-heated to a temperature ranging from 400 to 1000° C. As a result, the oxide powder is formed into the layer-structured oxide containing lithium, resulting in the active material powder.

If the re-heating temperature is less than 400° C., the temperature is too low to provide the layer-structured oxide containing lithium. While if the re-heating temperature exceeds 1000° C., turbulence occurs in the crystalline structure, preventing generation of the layer-structured oxide containing lithium.

It is preferable that the oxide powder can be re-heated in the air. It is preferable to re-heat the oxide powder in the oxygenic atmosphere when Ni is used as the ingredient of the active material powder. As a result, the layer-structured oxide containing lithium can be obtained quite efficiently.

In the second aspect of the present invention, the ingredient of the active material powder is mixed in a suspension or in the liquid state as an emulsion for complete homogenization.

Since the thus homogenized droplets are sprayed and burned, the resultant active material powder keeps its composition uniform.

The ingredient momentarily reacts with heat generated in the combustion process within the droplets into the active material. In case of using the emulsion, the solvent of the droplet is evaporated in the heat generated in the combustion process and discharged to the outside of the reaction system as wastes.

The resultant active material has a uniform composition.

Particles of the above active material are generated from the above-sprayed droplets. The active material is formed of a primary particle having a fine size or a secondary particle formed as a combination of those primary particles. (See FIG. 4) The particles derived from the sprayed droplets have an average particle size ranging from 0.01 to 10 $\mu$m.

In the present invention, the droplet is heated by burning the combustible liquid. The droplet is sprayed in the oxygenic atmosphere. The resultant layer-structured oxide containing lithium provides a high quality active material powder without oxygen defects.

Oxygen defects caused in the layer-structured oxide containing lithium can be expressed by a function of temperature and partial pressure of oxygen. As the temperature increases or the partial pressure of oxygen decreases, oxygen defects are likely to occur. Therefore oxygen defects can be prevented by keeping the partial pressure of oxygen to a specific level.

The active material powder used as the positive electrode or a negative electrode of the lithium secondary battery has a uniform composition and small particle size and hardly causes capacity deterioration resulted from charge/discharge cycles under a high current density. As no oxygen defects occur, capacity deterioration rarely occurs resulted from the repetitive charge/discharge cycles, thus providing an excellent lithium secondary battery.

Accordingly the present invention provides the active material powder for the lithium secondary battery which is formed of a layer-structured oxide containing lithium having uniform composition, small particle size and preventing capacity deterioration irrespective of the repetitive charge/discharge cycles under a high current density.

According to the third aspect of the invention, the material is formed of lithium compound and metal or metal compound. It is preferable to use at least one kind of a compound selected from a group consisting of Li oxide, Li hydroxide, Li carbonate, Li nitrate, Li sulfate, Li acetate and Li oxalate. The above compounds can be easily ionized in solution for improving the uniformity.

According to the fourth aspect of the invention, the metal is at least one metal element selected from a group consisting of Mn, Ni, Co, Ti, V, Al, Zn, Mo, Cu, Fe and Cr. Preferably the metal compound is at least one kind of metal or metal compound selected from a group consisting of oxide, hydroxide, carbonate, nitrate, sulfate, acetate and oxalate of the corresponding metal. They can be easily ionized in solution for improving the uniformity.

Among those of the metal group, Mn, Ti and V are especially suitable for producing the active material powder formed of a spinel oxide containing lithium of the first invention. While Mn, Ni, Co, V, Al, Zn, Mo, Cu, Fe and Cr are suitable for producing the active material powder formed of a layer-structured oxide containing lithium of the second invention.

According to the fifth aspect of the invention, at least one kind of solvent selected from the group consisting of water, acidic water solution, alkaline water solution and organic solvent can be used as the solvent.

It is preferable to heat the droplets in the heated atmosphere at a temperature ranging from 300 to 1200° C. If the temperature is less than 300° C., heating process would not be executed satisfactorily. While if the temperature exceeds 1200° C., the oxide containing lithium is decomposed, thus generating a different phase.

In either of the above-described methods, a small amount of additive, for example, Br, Mg, Zn, Nb, Sn, Sb and the like may be added to the active material powder for improving the cycle characteristics. As the ingredient of the active material is formed into the suspension or the emulsion in either method of the invention, mixing the small amount of the above additive thereto can be easily done. The electrolyte for the lithium secondary battery using the active material powder obtained from the present invention may be either non-aqueous or aqueous type. However it is more preferable to use the non-aqueous electrolyte in order to provide further excellent battery characteristics.

EXAMPLES

Example 1

Figure 1:
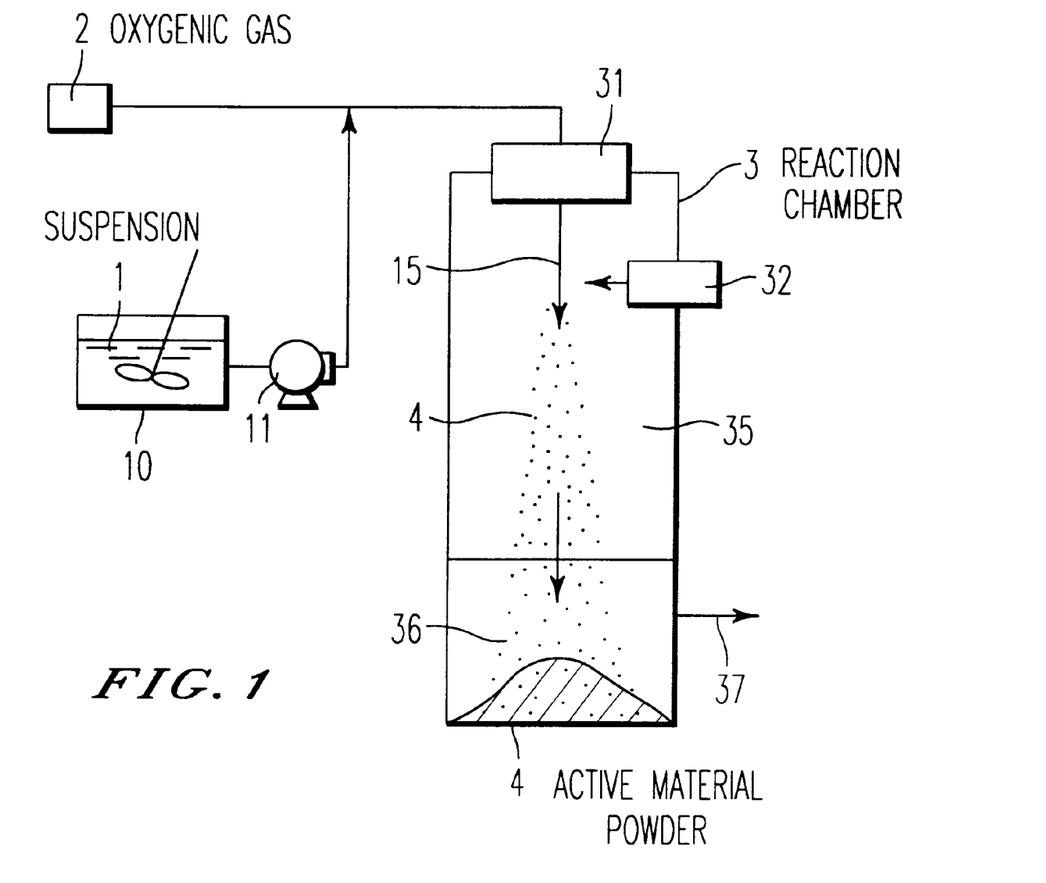
FIG. 1 is a schematic view of a system for producing the active material powder through the producing method of Example 1.

Referring to FIG. 1, a method of producing an active material powder for a lithium secondary battery according to the first aspect of the present invention is described as well as the system for implementing the invented method.

According to the method of producing the active material powder of Example 1, a suspension 1 prepared by suspending an ingredient of the active material in a combustible liquid is sprayed together with an oxygenic gas 2 into a reaction chamber 3 through an atomizer 31 in the form of a droplet 15.

The combustible liquid is burned within the reaction chamber 3 to heat the droplet 15. This combustion process causes the ingredient contained in the droplet 15 to react and the solvent of the droplet 15 to be evaporated. Then an active material powder 4 formed of spinel oxide containing lithium is produced and collected in a container 36.

The system for producing the active material powder comprises a reaction chamber 3 and quantitative pump 11 that supplies the suspension 1 (or an emulsion, the same hereinafter) charged in a tank 10 to the reaction chamber 3. The reaction chamber 3 comprises a reaction (combustion) section 35, an atomizer 31 for spraying the suspension 1 to the reaction section 35, a pilot burner 32 for assisting the combustion of sprayed suspension 1 and a container 36 where the produced active material powder is collected.

For producing the active material powder, the oxygenic gas 2 using the air and the suspension 1 are supplied to the atomizer 31 through which the oxygenic gas 2 and the suspension 1 are sprayed to the reaction section 35 in the form of the droplet 15.

The pilot burner 32 set in the reaction section 35 ignites the combustible liquid contained in the suspension 1. Then the combustible liquid is burned to form a burner flame to produce the active material powder 4 for the lithium secondary battery. The obtained active material powder 4 is collected in the container 36 set under the reaction chamber 3. Exhaust gas 37 generated accompanied with the production of the active material powder 4 is discharged to the outside of the reaction chamber 3 via the container 36.

In Example 1, the ingredient of the active material powder is suspended in combustible liquid to form the suspension.

The suspension is sprayed as droplets into the reaction chamber 3 for reacting in the solution. The ingredient instantaneously reacts in the heat generated by burning the combustible liquid in the droplet into the active material.

The solvent contained in the droplet is discharged from the reaction system at an early stage, thus allowing the active material to have a uniform composition. As particles of the active material are formed of the sprayed droplets, the active material is obtained as a mass of primary and secondary particles.

The droplet is heated by burning the combustible liquid, which is sprayed with the oxygenic gas. Therefore the active material powder formed of the spinel oxide containing lithium retains sufficient amount of oxygen.

When the active material powder being uniform in composition, small in particle size and free of oxygen defects is used for the positive electrode or negative electrode, capacity deterioration hardly occurs in a charge/discharge cycle under a high current density. As a result, an excellent lithium secondary battery can be obtained.

Example 2

Figure 2:
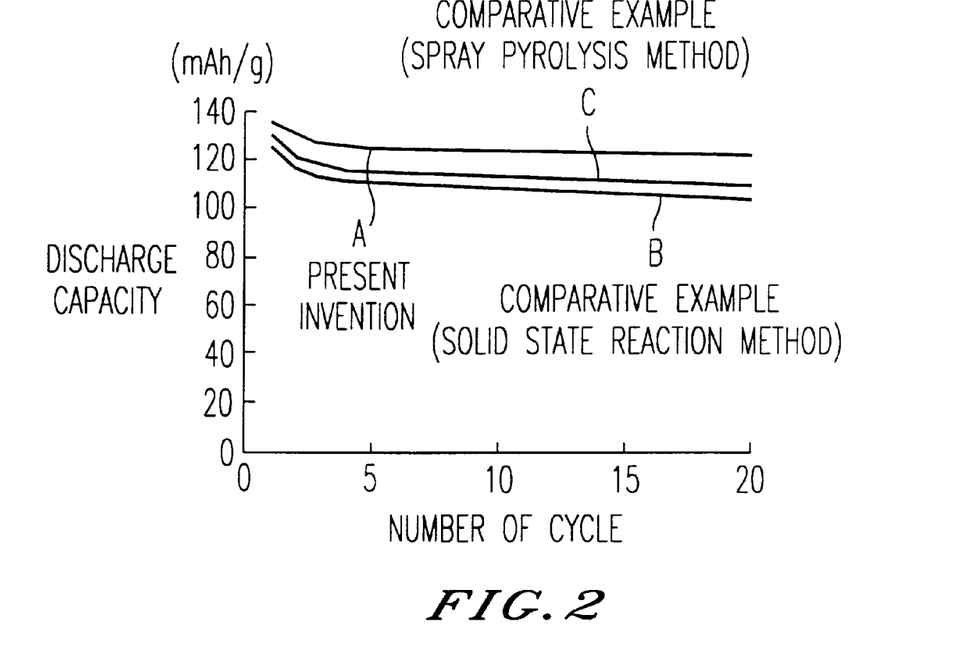
FIG. 2 is a graphical representation showing a relationship between the number of cycle and discharge capacity at a charge/discharge cycle of Example 2.
Figure 3:
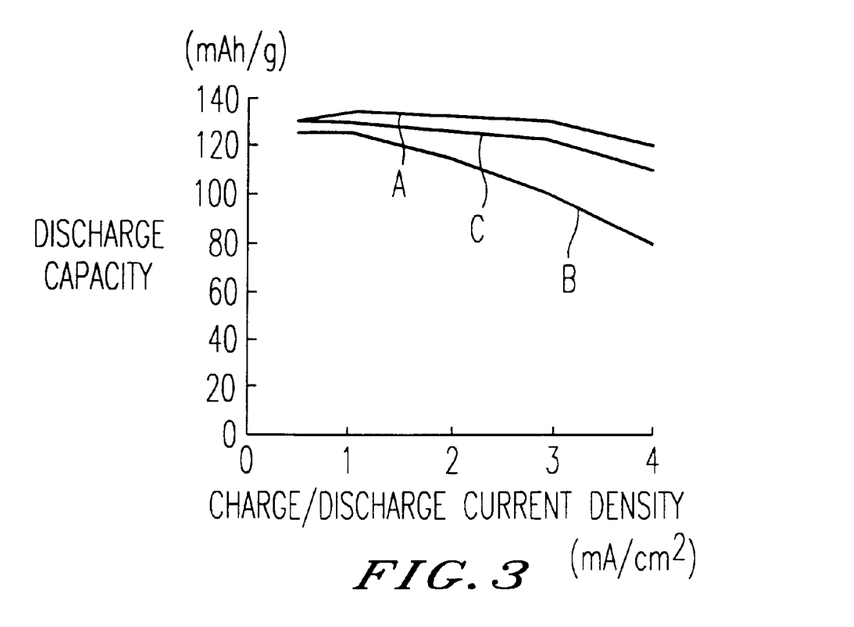
FIG. 3 is a graphical representation showing a relationship between current density of the charge/discharge cycle and the discharge capacity at a charge/discharge cycle of Example 2.

In Example 2, the active material powder obtained by the present invention is used to produce the lithium secondary battery. Two types of lithium secondary battery produced through the conventional method were prepared as comparative examples. Those three types of lithium secondary batteries including the present invention were subjected to a charge/discharge test. The test results are shown in FIGS. 2 and 3.

The active material powder of the present invention is produced by the system described in Example 1 as the active material for producing the positive electrode.

More specifically, $LiNO_3$ (lithium nitrate) and $Mn(NO_3)_2 \cdot 6H_2O$ (manganese nitrate 6 hydrate) were mixed by a molar ratio of 1:2. Distilled water was added to the mixture to provide a solution. Then sorbitan monolaurate as the emulsifier and kerosene as the combustible liquid were added to the mixture to produce the emulsion. The emulsion was supplied by the quantitative pump 11 and sprayed through the atomizer 31 to the reaction section 35 together with the oxygenic gas 2.

The amount of the oxygenic gas 2 was adjusted so that the partial pressure of oxygen falls in the range from 20 to 30%, taking the assumption that the combustible liquid was completely burned. At the same time, a pilot burner 32 was used to assist the combustion of droplets of sprayed emulsion and the oxygenic gas at a temperature ranging from 600 to 700° C.

As a result, active material as the spinel oxide containing lithium formed of $LiMn_2O_4$ was collected in the container 36.

The obtained active material powder, having uniform particle size, is formed of secondary particles each having its particle size of about 2 $\mu$m as a mass of primary particles each having its particle size of 0.1 $\mu$m or less.

The above heat temperature was measured by monitoring the temperature of a wall of the reaction (combustion) section through a sheathed thermocouple of 3 mm in diameter. Therefore the actual reaction temperature is evaluated to be higher than the obtained value by several hundreds order.

The thus-prepared active material A was used to produce the positive electrode as well as using acetylene black as the conductive material and PTFE as the binding agent. The negative electrode was produced by using Li metal as the active material.

The lithium secondary battery was produced using the positive electrode formed of $LiMn_2O_4$ and the negative electrode formed of Li metal. As non-aqueous electrolytic liquid, a mixture of PC(propylene carbonate) and DME (1,2dimethoxyetane) were used and a substance containing $LiClO_4$ was used as the electrolyte. A polypropylene film was used as the separator.

The prepared lithium secondary battery was subjected to the charge/discharge test under the condition of cut-off voltage at 3.5 to 4.5 V and current density under 1.0 to 4.0 $mA/cm^2$.

Two kinds of positive electrodes were prepared to form two types of the lithium secondary batteries as comparative examples in the same manner as the present invention.

The $LiMn_2O_4$ positive electrode used an active material "B" obtained through a solid state reaction method. Another positive electrode used an active material "C" obtained by synthesizing through a conventional spray pyrolysis method.

Those active materials "B" and "C" were prepared in the following manner.

The active material "B" obtained through the solid state reaction method was prepared by mixing lithium nitrate and electrolytic manganese dioxide and calcined at 700° C. for 120 hours.

Then the resultant $LiMn_2O_4$ active material was crushed into the active material to form the positive electrode as a comparative example.

The active material "C" obtained through the conventional spray pyrolysis method was prepared by mixing lithium nitrate and manganese nitrate 6 hydrate to form a water solution. The resultant water solution was sprayed with an ultrasonic vibrator and then subjected to heating and reaction within the electric furnace at 800° C.

The obtained $LiMn_2O_4$ active material was used to make the positive electrode as another comparative example in the same manner as above.

Two kinds of lithium secondary batteries were produced using the positive electrodes formed of the materials "B" and "C", respectively and were subjected to the charge/discharge test in the same manner as above.

The charge/discharge test results are shown in FIGS. 2 and 3.

FIG. 2 is a graph indicating a relationship between the number of charge/discharge cycles and the discharge capacity. FIG. 3 is a graph indicating a relationship between the charge/discharge current density and the discharge capacity.

In both graphs, a curve A shows the discharge capacity (mAh/g) of the lithium secondary battery using the active material powder obtained through the present invention. Curves B and C show each discharge capacity of the comparative lithium secondary batteries using the materials B and C, respectively.

As FIG. 2 shows, it is clear that the lithium secondary battery using the active material powder of the present invention provided a high initial capacity and prevented the capacity deterioration in spite of the repetitive charge/discharge cycles. As FIG. 3 shows, it is clear that the lithium secondary battery of the present invention rarely caused the capacity deterioration under the charge/discharge cycle at a high current density.

On the contrary, both comparative lithium secondary batteries using the materials "B" and "C" caused capacity deterioration at an early stage resulted from the charge/discharge cycle at a high current density.

Figure 4:
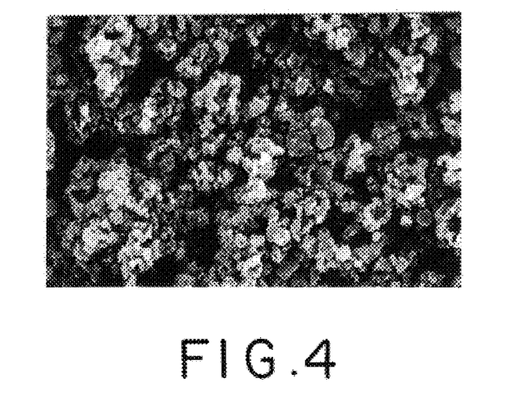
FIG. 4 is a picture showing a particle structure of an active material powder produced through the method of the present invention of Example 2 (×4000).
Figure 5:
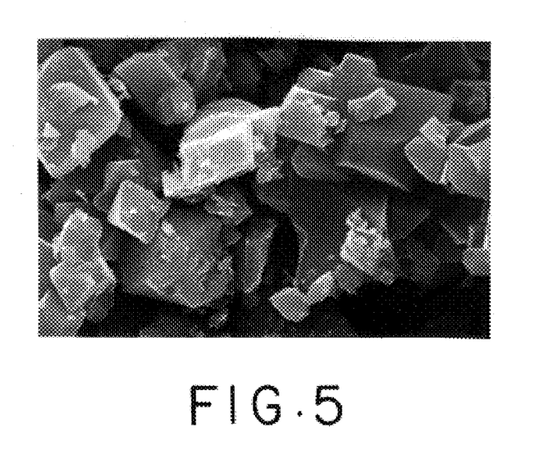
FIG. 5 is a picture showing a particle structure of the active material produced through the solid state reaction method as a comparative method of Example 2 (×4000).

The SEM photograph (×4000) of the particle structure of the active material powder obtained by the present invention was taken as shown in FIG. 4. Photographs of the respective particle structures of the lithium compound obtained through the solid state reaction method, i.e., material "B" and the lithium compound obtained through the conventional spray pyrolysis method, i.e., material "C" are shown in FIGS. 5 and 6, respectively.

As FIG. 4 shows, the active material powder of the present invention is formed of uniform spherical fine particles having the particle size of 0.1 $\mu$m or less. While the lithium compound, "B", is formed of relatively large and square plate-like shaped particles as FIG. 5 shows.

Figure 6:
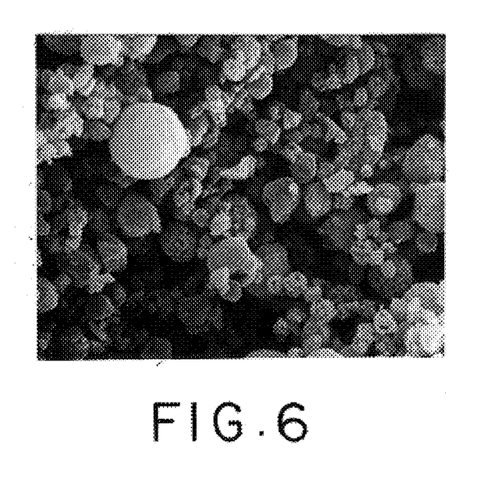
FIG. 6 is a picture showing a particle structure of the active material produced through the conventional spray pyrolysis method as the comparative example of Embodiment 2 (×4000).

The lithium compound, "C", is formed of spherical particles as shown in FIG. 6. However the particle size greatly varies in the range from 0.2 to 3 $\mu$m compared with that of the active material powder of the present invention.

Example 3

The mixture of $LinNO_3$ and $Mn(NO_3)_2 \cdot 6H_2O$ was prepared by a molar ratio of 1:2. The same amount of distilled water was added to the mixture into a water solution, which was further emulsified in the kerosene as the combustible liquid to form an emulsion in the manner similar to Example 2. The emulsion was used to form an active substance in the similar way to Example 2. The resultant active material was further subjected to the charge/discharge test similar to Example 2. The obtained characteristics were the same as those of Example 2.

The particle was observed to confirm its shape and size through SEM photograph in the same way as Example 2. It was confirmed that the active material powder is formed of fine particles having uniform size of 0.1 $\mu$m or less.

Example 4

The mixture was prepared by mixing $LiNO_3$ and $MNO_2$ (electrolytic manganese dioxide) (molar ratio=1:2) homogeneously, which was then suspended in the kerosene into the suspension.

The active material was obtained using the suspension in the similar manner to Example 2. The charge/discharge test was conducted in the same way as Example 2, resulting in similar characteristics to those of Example 2.

The particle was observed to confirm its shape and size through SEM photograph in the similar manner to Example 2. It was confirmed that the active material powder is formed of fine particles having uniform size of 0.1 $\mu$m or less, holding the particle size of $MnO_2$ as the ingredient.

Comparative Example

The active material powder was prepared in the same way as Example 2 except that the amount of the oxygenic gas was adjusted to set the partial pressure of oxygen to 10% with the assumption that the combustible liquid was completely burned.

The charge/discharge test was conducted in the same way as in Example 2. The resultant capacity was equivalent to only about 70% of Example 2.

The amount of oxygen contained in the comparative active material powder was obtained through inductively coupled plasma atomic emission spectrometry and titration of potassium permangarate. The obtained result, $LiMn_2O_{3.91}$, indicated the existence of oxygen defects.

The active material powder of Example 2 indicated no oxygen defects. It is assumed that the above-described capacity deterioration of the lithium secondary battery using the active material powder of the comparative example was caused by the existence of oxygen defects resulted from synthesis under inappropriate partial pressure of oxygen.

Example 5

The active material powder formed of a layer-structured oxide containing lithium was prepared using the system shown in Example 1. Then the lithium secondary battery using the above active material was subjected to the charge/discharge test (conducted in Examples 6 to 8).

Water solution of Li nitrate (1 mol/l) and water solution of Ni nitrate (1 mol/l) were mixed by 1:1 into 600 cc of water solution. The water solution (600 cc), fatty acid glycerin ester as the emulsifier (24 g) and kerosene (400 cc) were mixed and stirred to form stable emulsion.

The emulsion was sprayed and ignited to form a burner flame. The oxide powder was synthesized at the position where the flame temperature was measured at 900° C. The partial pressure of oxygen within the reaction chamber was so adjusted to 10% by using the mixture gas containing air and oxygen gas.

Then black powder obtained as the oxide powder was re-heated in the oxygen gas atmosphere at the temperature ranging from 700 to 1000° C. for 2 hours.

Table 1 shows each ratio of diffraction peak strength ((003) plane/(104) plane) of the crystalline phase and the layer-structured oxide containing lithium obtained by X-ray diffraction pattern after re-heating.

In this Example, the synthetic powder (oxide powder) before re-heating produced smaller amount of the layer-structured oxide containing lithium. By heating the powder for a short period, the active material powder formed of the lithium-containing oxide with well developed layer structure was obtained.

A positive electrode was produced by using the layer-structured oxide containing lithium obtained in the above-described manner at re-heating temperature of 900° C., acetylene black as the conductive material and PTFE as the binding agent. The Li metal was used as the active material for forming the negative electrode.

The lithium secondary battery was derived from the $LiNiO_2$ positive electrode and Li metal negative electrode.

As the non aqueous electrolytic solution, a mixture of PC (propylene carbonate) and DME(1.2 dimethoxyethane) was used. As the electrolyte, the substance containing $LiClO_4$ was used. As the separator, polypropylene film was used.

The thus prepared lithium secondary battery was subjected to the charge/discharge test under the condition at cut-off voltage of 2.7 to 4.2 V and a current density under 1.0 to 4.0 mA/cm$^2$. The measurement results are shown in Table 2.

Referring to Table 2, the active material formed of the layer-structured oxide containing lithium provided high initial capacity and allowed the lithium secondary battery to cause less capacity deterioration irrespective of repetitive charge/discharge cycles. The active material hardly deteriorated capacity of the lithium secondary battery irrespective of the charge/discharge cycle at a high current density.

TABLE 1

| Re-heat tem. (°C.) | Crystalline phase | Ratio of diffraction peak strength I(003)/I(104) |
|---|---|---|
| 700 | $LiNiO_2$, NiO, $Li_2CO_3$ | — |
| 800 | $LiNiO_2$ | 0.21 |
| 900 | $LiNiO_2$ | 1.05 |
| 1000 | $LiNiO_2$ | 0.82 |

TABLE 2

| Current density | Initial capacity | Capacity at 10th cycle | Capacity at 50th cycle |
|---|---|---|---|
| 1 mA/cm$^2$ | 197 mAh/g | 193 mAh/g | 179 mAh/g |
| 2 mA/cm$^2$ | 195 mAh/g | 190 mAh/g | 176 mAh/g |
| 4 mA/cm$^2$ | 192 mAh/g | 186 mAh/g | 171 mAh/g |

Example 6

A water solution (600 cc) was prepared by mixing water solution of Li nitrate (1 mol/l) and Ni nitrate (1 mol/l) by 1:1. The water solution (600 cc), fatty acid glycerin ester as the emulsifier (24 g) and kerosene (400 cc) were mixed and stirred to form stable emulsion. The emulsion was sprayed and ignited to form the burner flame, by which oxide powder was synthesized at 900° C. at a position for measuring the flame temperature.

The partial pressure of oxygen in the reaction chamber was adjusted to 25% by using mixture gas containing air and oxygen gas. The resultant black powder as the oxide powder was re-heated in oxygen gas atmosphere at 900° C. for 2 hours. The obtained active material powder was formed of the layer-structured oxide containing lithium exhibiting a well developed layer structure.

A positive electrode was produced by using the thus prepared active material powder, acetylene black as the conductive material and PTFE as the binding agent. The negative electrode was produced by using Li metal as the active material.

The lithium secondary battery was derived from using the above-prepared positive electrode formed of $LiNiO_2$ and the negative electrode formed of Li metal. As the non-aqueous electrolytic solution, mixture of PC and DME was used. As the electrolyte, the substance containing $LiClO_4$ was used. As the separator, polypropylene film was used.

The lithium secondary battery was subjected to the charge/discharge test under the cut-off voltage of 2.7 to 4.2 V and the current density under 1.0 to 4.0 MA/cm$^2$. The results are shown in Table 3.

Referring to Table 3, the active material powder formed of layer-structured oxide containing lithium provided high initial capacity and hardly deteriorated capacity of the lithium secondary battery irrespective of the repetitive charge/discharge cycles. The active material of this Example hardly deteriorated capacity of the lithium secondary battery irrespective of the charge/discharge cycle at a high current density.

TABLE 3

| Current Density | Initial Capacity | Capacity at 10th cycle | Capacity at 50th cycle |
| --- | --- | --- | --- |
| 1 mA/cm$^2$ | 198 mAh/g | 195 mAh/g | 180 mAh/g |
| 2 mA/cm$^2$ | 197 mAh/g | 191 mAh/g | 177 mAh/g |
| 4 mA/cm$^2$ | 192 mAh/g | 186 mAh/g | 172 mAh/g |

Example 7

A water solution (600 cc) was prepared by mixing water solution of Li nitrate (1 mol/l) and Co nitrate (1 mol/l) by 1:1. The water solution (600 cc), fatty acid glycerin ester as the emulsifier (24 g) and kerosene (400 cc) were mixed and stirred to form stable emulsion. The emulsion was sprayed and ignited to form a burner flame, by which oxide powder was synthesized at 900° C. at a position for measuring the flame temperature.

The partial pressure of oxygen in the reaction chamber was adjusted to 10% by using mixture gas containing air and oxygen gas.

The resultant black powder as the oxide powder was re-heated in an oxygen gas atmosphere at 800° C. for 2 hours. The obtained active material was formed of a lithium-containing oxide exhibiting a well developed layer structure.

A positive electrode was produced by using the thus prepared active material, acetylene black as the conductive material and PTFE as the binding agent. The negative electrode was produced by using Li metal as the active material.

The lithium secondary battery was derived from using the positive electrode formed of LiCoO$_2$ and the negative electrode formed of Li metal. As the non-aqueous electrolytic solution, mixture of PC and DME was used. As the electrolyte, the substance containing LiClO$_4$ was used. As the separator, polypropylene film was used.

The lithium secondary battery was subjected to the charge/discharge test under the cut-off voltage of 2.7 to 4.2 V and the current density under 1.0 to 4.0 mA/cm$^2$. The test results are shown in Table 4.

Referring to Table 4, the active material formed of the layer-structured oxide containing lithium provided high initial capacity and hardly deteriorated capacity of the lithium secondary battery irrespective of the repetitive charge/discharge cycles. The active material powder of this Example hardly deteriorated capacity of the lithium secondary battery irrespective of the charge/discharge cycles at a high current density.

TABLE 4

| Current Density | Initial Capacity | Capacity at 10th cycle | Capacity at 50th cycle |
| --- | --- | --- | --- |
| 1 mA/cm$^2$ | 138 mAh/g | 138 mAh/g | 132 mAh/g |
| 2 mA/cm$^2$ | 138 mAh/g | 138 mAh/g | 132 mAh/g |
| 4 mA/cm$^2$ | 135 mAh/g | 135 mAh/g | 127 mAh/g |

Example 8

A suspension (600 cc) was prepared by mixing water solution of Li nitrate (1 mol/l) and NiO powder by the Li tp Ni molar ratio of 1:1. The suspension (600 cc), fatty acid glycerin ester as the emulsifier (24 g) and kerosene (400 cc) were mixed and stirred to form the emulsion. The emulsion was sprayed and ignited to form a burner flame, by which oxide powder was synthesized at 900° C. at a position for measuring the flame temperature.

The partial pressure of oxygen in the reaction chamber was adjusted to 25% by using mixture gas containing air and oxygen gas.

The resultant black powder as the oxide powder was re-heated in an oxygen gas atmosphere at 900° C. for 2 hours. The obtained active material powder was formed of a layer-structured oxide containing lithium exhibiting well developed layer structure.

A positive electrode was produced by using the thus prepared active material powder, acetylene black as the conductive material and PTFE as the binding agent. The negative electrode was prepared by using Li metal as the active material.

The lithium secondary battery was derived from using the positive electrode formed of LiNiO$_2$ and the negative electrode formed of Li metal. As the non-aqueous electrolytic solution, a mixture of PC and DME was used. As the electrolyte, the substance containing LiClO$_4$ was used. As the separator, polypropylene film was used.

The lithium secondary battery was subjected to the charge/discharge test under the condition at the cut-off of 2.7 to 4.2 V and the current density under 1.0 to 4.0 mA/cm$^2$. The test results are shown in Table 5.

Referring to Table 5, the active material powder formed of the oxide containing layer lithium provided high initial capacity and hardly deteriorated capacity of the lithium secondary battery irrespective of the repetitive charge/discharge cycles. The active material of this Example hardly deteriorated capacity of the lithium secondary battery irrespective of the charge/discharge cycles at a high current density.

TABLE 5

| Current Density | Initial Capacity | Capacity at 10th cycle | Capacity at 50th cycle |
| --- | --- | --- | --- |
| 1 mA/cm$^2$ | 194 mAh/g | 190 mAh/g | 175 mAh/g |
| 2 mA/cm$^2$ | 190 mAh/g | 186 mAh/g | 170 mAh/g |
| 4 mA/cm$^2$ | 185 mAh/g | 180 mAh/g | 165 mAh/g |

The present invention provides a method of producing active material powder formed of a spinel oxide containing a lithium or a layer-structured oxide containing lithium for the lithium secondary battery, which has uniform composition and fine particle size and hardly causes oxygen defects as well as capacity deterioration resulted from the repetitive charge/discharge cycles at a high current density.

What is claimed is:

1. A method of producing a powder of a spinel oxide containing lithium and at least one other metal, for a lithium secondary battery, comprising the steps of:

preparing an aqueous solution comprising lithium ions and ions of at least one other metal where the lithium ions are provided by a compound selected from the group consisting of Li oxide, Li hydroxide, Li carbonate, Li nitrate, Li sulfate, Li acetate and Li oxalate and where the other metal ions are selected from at least one element of the group consisting of Mn, Ni, Co, Ti, V, Al, Zn, Mo, Cu, Fe and Cr and are provided by a compound selected from the group consisting of oxide, hydroxide, carbonate, nitrate, sulfate, acetate and oxalate of said metal or mixtures thereof;

forming an emulsion from said solution with a combustible organic liquid;

spraying said emulsion in the form of droplets into a reaction chamber containing an amount of oxygen sufficient to provide a partial pressure of oxygen of 20% or more as measured in the exhaust gas from said chamber to produce a lithium spinel free of oxygen defects;

burning said combustible liquid contained in said droplets at a temperature of 300° C. to 1200° C. and reacting said ingredients contained therein to produce a powder formed of a spinel oxide containing lithium.

2. The method of producing an active material powder for a lithium secondary battery of claim 1, wherein the aqueous phase of said solution is at least one selected from the group consisting of water, acidic water solution, and alkaline water solution.

3. The method of claim 1, wherein the powder obtained has an average particle size ranging from 0.01–10 μm.

4. The method of claim 1, wherein the combustible liquid is kerosene or gasoline.

5. The method of claim 1, wherein the emulsion contains an emulsifying agent.

6. The method of claim 5, wherein the emulsifying agent is a nonionic surfactant.

7. A method of producing a powder of a layered-structured oxide containing lithium and at least one other metal, for a lithium secondary battery, comprising the steps of:

preparing an aqueous solution comprising lithium ions and ions of at least one other metal where the lithium ions are provided by a compound selected from the group consisting of Li oxide, Li hydroxide, Li carbonate, Li nitrate, Li sulfate, Li acetate and Li oxalate and where the other metal ions are selected from at least one element of the group consisting of Mn, Ni, Co, Ti, V, Al, Zn, Mo, Cu, Fe and Cr and are provided by a compound selected from the group consisting of oxide, hydroxide, carbonate, nitrate, sulfate, acetate and oxalate of said metal or mixtures thereof;

forming an emulsion from said solution with a combustible organic liquid;

spraying said emulsion in the form of droplets into a reaction chamber containing an amount of oxygen sufficient to provide a partial pressure of oxygen of 10% or more as measured in the exhaust gas of said chamber;

burning said combustible liquid contained in said droplets at a temperature of 300° C. to 1200° C. and reacting said ingredients contained therein to produce a powder formed of a metal oxide; and reheating said oxide powder at 400–1,000° C. to produce a powder formed of a layer-structured oxide containing lithium.

8. The method of producing an active material powder for a lithium secondary battery of claim 7, wherein the aqueous phase of said solution is at least one selected from the group consisting of water, acidic water solution, and alkaline water solution.

9. The method of claim 7, wherein the partial pressure of oxygen is 20% or more.

10. The method of claim 7, wherein the powder obtained has an average particle size ranging from 0.01–10 μm.

11. The method of claim 7, wherein the combustible liquid is kerosene or gasoline.

12. The method of claim 7, wherein the emulsion contains an emulsifying agent.

13. The method of claim 7, wherein the emulsifying agent is a nonionic surfactant.

* * * * *